United States Patent [19]

Patrician et al.

[11] Patent Number: 5,590,386
[45] Date of Patent: Dec. 31, 1996

[54] METHOD OF MAKING AN ALLOY OF TUNGSTEN AND LANTHANA

[75] Inventors: Thomas J. Patrician, Monroeton; Harry D. Martin, III, Troy, both of Pa.

[73] Assignee: Osram Sylvania Inc., Danvers, Mass.

[21] Appl. No.: 507,183

[22] Filed: Jul. 26, 1995

[51] Int. Cl.$^6$ .................................................. C22C 1/10
[52] U.S. Cl. .............................. 419/20; 419/38; 419/44; 419/54
[58] Field of Search ................................ 419/20, 38, 44, 419/54; 423/21.1

[56] References Cited

U.S. PATENT DOCUMENTS

| | | | |
|---|---|---|---|
| 3,086,103 | 4/1963 | Hackman et al. | 219/74 |
| 3,159,908 | 12/1964 | Anders | 29/182.5 |
| 3,802,851 | 4/1974 | Dunham | 428/547 |
| 3,853,491 | 12/1974 | Dunham | 428/547 |
| 4,764,491 | 8/1988 | Quadir | 501/103 |
| 4,923,673 | 5/1990 | Litty | 419/20 |
| 4,950,327 | 8/1990 | Eck et al. | 75/232 |
| 5,284,614 | 2/1994 | Chen et al. | 419/20 |

OTHER PUBLICATIONS

Timofeeva, N. I., et al; Reaction of Rare-Earth Element Oxides with Water 1970, Izv. Akad. Nauk SSSR, Neorg. Matter. 6(3), 605.

*Primary Examiner*—Ngoclan Mai
*Attorney, Agent, or Firm*—Robert F. Clark

[57] ABSTRACT

In a method of making alloy of tungsten and lanthana, lanthanum hydroxide is blended with tungsten metal powder, the mixture is pressed to form a pressed ingot, optionally presintered, and sintered to form the alloy. The use of lanthanum hydroxide as the source of the lanthana dopant allows the pressed or presintered ingots to be stored in air prior to sintering for prolonged periods without becoming degraded from exposure to atmospheric moisture.

8 Claims, No Drawings

METHOD OF MAKING AN ALLOY OF TUNGSTEN AND LANTHANA

CROSS-REFERENCES TO RELATED APPLICATIONS

This application is related to co-pending application Ser. No. 08/507,184, filed Jul. 26, 1995 pending.

1. Technical Field

This invention relates to alloys of tungsten containing oxidic additives. More particularly, it relates to alloys of tungsten containing lanthanum oxide (lanthana) additives.

2. Background Art

Examples of tungsten-lanthana alloys and their uses are given in U.S. Pat. Nos. 4,923,673, 3,159,908 and 3,086,103. While these alloys have a number of uses, they are particularly well suited for fabricating tungsten welding electrodes. It is well known that oxidic additives in tungsten welding electrodes improve the durability and emission properties of tungsten welding electrodes. In the past, thorium oxide was the preferred additive. However, because of environmental concerns, tungsten-thoria alloys have become less desirable. Thorium oxide has radioactive properties and tungsten-thoria alloys have relatively high sintering temperatures which affect the energy consumption of electrode manufacturers. Alternatively, tungsten-lanthana alloys are non-radioactive and may be sintered at lower temperatures than tungsten-thoria alloys thereby making them more environmentally compatible.

The most direct method for forming an ingot of a tungsten-lanthana alloy is the simple blending of tungsten metal powder with powdered lanthana. U.S. Pat. No. 4,923,673 describes such a method. Tungsten metal powder and powdered lanthanum oxide are blended together, compacted with a multiphase pressure buildup and sintered with a multiphase temperature buildup. Prior to blending with tungsten powder, the lanthana powder is relaxed to reduce the average particle size of the lanthana particles to between 0.5–2.0 µm. The relaxation is accomplished by aging the lanthana powder at 25°–30° C. for at least 20 hours.

Another known method for preparing tungsten-lanthana alloys involves wet doping of tungsten oxides. Tungsten blue oxide ($WO_{2.8}$) is mixed with a solution of a soluble lanthanum salt, preferably lanthanum nitrate ($La(NO_3)_3 \cdot 6H_2O$), until the tungsten blue oxide is thoroughly wet and a slurry is formed. The slurry is then stirred and heated until all the liquid is evaporated yielding a doped tungsten blue oxide. The doped tungsten blue oxide is then reduced in a hydrogen atmosphere to convert the lanthanum salt to lanthanum oxide and reduce the tungsten blue oxide to tungsten metal. The lanthana doped tungsten metal powder is then pressed, presintered and sintered to form an ingot using conventional powder metallurgical techniques.

A major disadvantage in the production of ingots of tungsten-lanthana alloys is the instability of the intermediate pressed or presintered ingots prior to sintering. As described above, the blends of tungsten metal and lanthana are pressed into ingot shapes and, optionally, presintered to improve handling prior to the final sintering. These intermediate pressed or presintered ingots are susceptible to degradation from exposure to atmospheric moisture while waiting to be sintered. The reason for the degradation is that lanthanum oxide exhibits a tendency to hydrate slowly when exposed to moisture. As the lanthana hydrates, its volume increases creating internal stresses in the ingot which cause it to crack and eventually crumble. Thus, the intermediate pressed or presintered ingots cannot be stored in air for long periods of time prior to sintering. The instability of the intermediate pressed or presintered ingots acts as a constraint on the manufacturing process because the ingots must be sintered soon after they are formed. Therefore, it would be desirable to be able to make a more stable-intermediate ingot which could be stored in air prior to sintering without cracking and crumbling.

SUMMARY OF THE INVENTION

It is an object of the invention to obviate the disadvantages of the prior art.

It is a further object of the invention to provide a method of making a tungsten-lanthana alloy wherein the intermediate pressed or presintered ingots are resistant to degradation from exposure to moisture.

It is still a further object of the invention to provide a more flexible manufacturing method for tungsten-lanthana alloys.

In accordance with one aspect of the invention, there is provided a method of making an alloy of tungsten and lanthana comprising the steps of:

forming a mixture of tungsten metal powder and lanthanum hydroxide powder, pressing the mixture to form a pressed ingot, and sintering the ingot at a temperature sufficient to form the alloy of tungsten and lanthana.

In accordance with another aspect of the invention, the lanthanum hydroxide powder is obtained by heating lanthanum oxide in a water saturated atmosphere until at least 95% of the lanthanum oxide is converted to lanthanum hydroxide.

DESCRIPTION OF THE PREFERRED EMBODIMENTS

For a better understanding of the present invention, together with other and further objects, advantages and capabilities thereof, reference is made to the following disclosure and appended claims.

The use of lanthanum hydroxide ($La(OH)_3$) as the precursor for the lanthana additive in tungsten-lanthana alloys yields greater flexibility in the manufacture of tungsten-lanthana alloys because the intermediate pressed or presintered ingots can be stored in air for prolonged periods. Furthermore, since the lanthanum hydroxide can be directly blended with the powdered tungsten metal, there are fewer manufacturing steps compared to wet doping methods.

Lanthanum hydroxide converts to lanthanum oxide at a relatively low temperature. From thermal gravimetric analyses, it has been shown that lanthanum hydroxide is completely converted to the oxide at about 800° C. Thus, the temperatures used for presintering and sintering the ingots are sufficient to cause complete conversion of the hydroxide to the oxide. Lanthanum hydroxide may be obtained as a raw material and used directly or the more readily available lanthanum oxide ($La_2O_3$) may be obtained and converted to the hydroxide. The oxide can be obtained from Rhone-Poulenc Basic Chemical Co., Shelton, Conn. and UNICAL 76 MOLYCORP, White Plains, N.Y. In order to effect conversion to the hydroxide, lanthanum oxide is exposed to water vapor until at least 95% of the lanthanum oxide is converted to the hydroxide. This can be accomplished by heating lanthanum oxide in a water saturated atmosphere at about 60° C. for about 12 hours. The weight of the exposed lanthanum oxide is monitored to determine the extent of the conversion. As the hydration occurs, the weight of the powder increases. Once the hydration is complete, the converted powder can then be analyzed by x-ray diffraction to confirm conversion to the hydroxide. During the conversion, there is a volume increase and a breakup of agglomerated lanthana particles. Before conversion, the average particle size of the oxide as determined by Fisher Sub-Sieve Sizer (FSSS) is about 3.5 µm. After conversion to the hydroxide, the average particle size is <1.0 µm. The amount of lanthanum hydroxide used in the blend is calculated to yield the desired amount of lanthana in the alloy after final sintering. For each percent by weight lanthana desired, 1.17 weight percent of the hydroxide is added to the blend.

Tungsten metal powder is high intensity blended with the predetermined amount of lanthanum hydroxide. Preferably, a pure tungsten powder having a particle size of about 1.4 to 1.6 µm FSSS is used. Typical properties of a suitable tunsgten powder are shown in Table 1. Such a tungsten powder is manufactured by OSRAM SYLVANIA INC., Towanda, Pa. under the designation M-25.

TABLE 1

| Tungsten Powder | |
| --- | --- |
| Al | 4 ppm |
| Ca | 1 ppm |
| Cr | 5 ppm |
| Cu | <1 ppm |
| Fe | 24 ppm |
| Mg | <1 ppm |
| Mn | <1 ppm |
| Ni | 9 ppm |
| Si | 1 ppm |
| Sn | 2 ppm |
| Na | 9 ppm |
| K | <10 ppm |
| Mo | <8 ppm |
| $O_2$ | 0.04% |
| $H_2O$ | 0.02% |
| Porosity | 0.702 |
| FSSS | 1.54 µm |
| Bulk Density | 33.30 g/in$^3$ |

A preferred range of lanthana concentrations for tungsten-lanthana alloys is from about 0.1 to about 2.0 wt. % lanthana. A more preferred range for welding electrode applications is about 1.2 to about 1.6 wt. % lanthana. Table 2 gives both the chemical and physical specifications for the unblended tungsten powder and W/La(OH)$_3$ blend for a tungsten-lanthana alloy containing 1.5 weight percent lanthana (W-1.5% lanthana). The amounts shown are either the preferred range or the maximum value permitted.

TABLE 2

| W-1.5% lanthana | | |
| --- | --- | --- |
| | Unblended tungsten powder | W/La (OH)$_3$ blend |
| Al | 10 ppm | 10 ppm |
| Ca | 10 ppm | 10 ppm |
| Cr | 10 ppm | 10 ppm |
| Cu | 10 ppm | 10 ppm |
| Fe | 50 ppm | 50 ppm |
| Mg | 5 ppm | 5 ppm |
| Mn | 5 ppm | 5 ppm |
| Ni | 20 ppm | 20 ppm |
| Si | 20 ppm | 20 ppm |
| Sn | 3 ppm | 3 ppm |
| Mo | 60 ppm | 60 ppm |
| Na | 35 ppm | 35 ppm |
| K | 15 ppm | 15 ppm |
| LOR* | 2200 ppm | 1600 ppm |

TABLE 2-continued

| W-1.5% lanthana | | |
| --- | --- | --- |
| | Unblended tungsten powder | W/La (OH)$_3$ blend |
| C | 25 ppm | 25 ppm |
| $H_2O$ | 600 ppm | 600 ppm |
| FSSS | 1.4–1.6 µm | 1–4–1.6 µm |
| Tap Density | — | 7.1–8.0 g/cm$^3$ |
| $La_2O_3$** | — | 1.2–1.6 wt. % |

*weight loss on reduction
**based on lanthanum hydroxide conversion to lanthana

The W/La(OH)$_3$ blend is pressed into ingots using a continuous compaction cycle. The pressed ingots are dimensionally stable and can be stored in air for at least 1 to 2 months without degrading. It is believed that the pressed ingots should be stable indefinitely. The ingots may be presintered at 1300° C. to facilitate handling. Final sintering is done at about 1800° C. and may be performed in a hydrogen atomsphere by direct-resistance sintering or in a batch furnace or push-through muffle furnace. A typical sintering schedule for a push-through muffle furnace involves slow heating to 1800° C. over a 15 to 20 hour period and then holding at 1800° C. for at least 8 hours.

The following non-limiting example is presented.

Ingots of W-1.5% lanthana were made from a 300 kilogram blend containing a mixture 295.5 kg of tungsten powder and 5.245 kg of lanthanum hydroxide powder. The mixture of tungsten and lanthanum hydroxide powder was blended for 1 hour in a Model PMK-300-D blender manufactured by Littleford/Day of Florence, Kentucky. After blending, 6.0 kilogram ingots were formed by isostatically pressing the blended powder mixture at between about 35 to 45 ksi (2413 to 3102 bar) to produce ingots having a circular cross-section. The compaction was done continuously by increasing the pressure with no stops until the maximum pressure was attained. Once the maximum pressure was reached, the applied pressure was released immediately after a 15 second hold causing a rapid drop to atmospheric pressure. There were no intentional pause and holds at intermediate pressures during the compaction/release cycle. The dimensions of the pressed ingots thus formed were 914 mm in length by 27 mm in diameter. The pressed ingots were found to be dimensionally stable and did not crack and crumble with prolonged exposure to atmospheric moisture. The pressed ingots are stable because there is no additional hydration occurring to increase internal stresses in the ingots.

The pressed ingots were presintered for 20 minutes in a push-through furnace at 1300° C. to give the ingots extra strength for handling prior to final sintering. The presintering was done as soon after pressing as production constraints allowed. During the 1300° C. presintering, the lanthanum hydroxide in the ingot was completely converted to the oxide. It is believed that the reason why the presintered ingots do not crack upon re-hydration of the lanthana is that the original volume occupied by the hydroxide is available to the oxide for expansion during re-hydration thereby preventing degradation of the ingot.

The ingots were sintered to densities greater than 91% of the theoretical density for the alloy by different methods.

In one method, ingots were direct-resistance sintered in a hydrogen atmosphere by passing an electrical current through the ingot. A typical heating schedule for sintering the ingot was to heat the ingot from room temperature to 1800° C. at between about 10° to 25° C. /minute and then holding at 1800° C. for about 3.5 hours.

In another method, the sintering was performed in a hydrogen atmosphere in a batch, induction furnace. A typical sintering schedule involved heating for 11 hours to 1200° C., holding at 1200° C. for 2 hours, heating to 1800° C. over 7 hours, and holding at 1800° C. for 8 hours. The sintered densities of the ingots produced for all of the above methods ranged from 17.6 to 18.0 g/cm$^3$. Welding electrodes were then formed by conventional metalworking methods.

While there has been shown and described what are at the present considered the preferred embodiments of the invention, it will be obvious to those skilled in the art that various changes and modifications may be made therein without departing from the scope of the invention as defined by the appended claims.

We claim:

1. A method of making an alloy of tungsten and lanthana comprising the steps of:

heating lanthanum oxide in a water saturated atmosphere until at least 95% of the lanthanum oxide is convened to lanthanum hydroxide;

forming a mixture of a tungsten metal powder and the lanthanum hydroxide powder, pressing the mixture to form a pressed ingot, and sintering the ingot at a temperature sufficient to form the alloy of tungsten and lanthana.

2. The method of claim 1 wherein the lanthanum oxide is heated for about 12 hours at about 60° C.

3. The method of claim 1 wherein the alloy contains between about 0.1 to about 2.0 weight percent lanthana.

4. The method of claim 3 wherein the alloy contains between about 1.2 to about 1.6 weight percent lanthana.

5. The method of claim 1 wherein the pressed ingot is resistant to degradation from exposure to moisture.

6. The method of claim 1 wherein the pressed ingot is presintered at about 1300° C. prior to sintering to form a presintered ingot.

7. The method of claim 6 wherein the presintered ingot is resistant to degradation from exposure to moisture.

8. The method of claim 1 wherein the ingot is sintered at about 1800° C.

* * * * *